US 9,383,890 B2

(12) United States Patent
Grubbs et al.

(10) Patent No.: US 9,383,890 B2
(45) Date of Patent: Jul. 5, 2016

(54) SEMANTIC ZOOM OF GRAPHICAL VISUALIZATIONS IN INDUSTRIAL HMI SYSTEMS

(71) Applicant: General Electric Company, Schenectady, NY (US)

(72) Inventors: Robert William Grubbs, Roanoke, VA (US); Justin Varkey John, Cohoes, NY (US)

(73) Assignee: General Electric Company, Schenectady, NY (US)

( * ) Notice: Subject to any disclaimer, the term of this patent is extended or adjusted under 35 U.S.C. 154(b) by 191 days.

(21) Appl. No.: 13/830,475

(22) Filed: Mar. 14, 2013

(65) Prior Publication Data
US 2014/0282215 A1 Sep. 18, 2014

(51) Int. Cl.
*G06F 3/0481* (2013.01)
*G06F 3/01* (2006.01)
*G06F 3/0488* (2013.01)

(52) U.S. Cl.
CPC .............. *G06F 3/0481* (2013.01); *G06F 3/017* (2013.01); *G06F 3/04817* (2013.01); *G06F 3/04883* (2013.01); *G06F 2203/04806* (2013.01); *G06F 2203/04808* (2013.01)

(58) Field of Classification Search
CPC ............ G06F 17/30058; G06F 3/0482; G06F 3/04815; G05B 19/409
USPC .......................................... 715/863; 345/634
See application file for complete search history.

(56) References Cited

U.S. PATENT DOCUMENTS

| | | | |
|---|---|---|---|
| 6,943,811 B2 | 9/2005 | Matthews | |
| 7,109,998 B2 | 9/2006 | Smith | |
| 7,552,398 B2 | 6/2009 | Bier et al. | |
| 8,169,405 B2 | 5/2012 | Hunleth et al. | |
| 2005/0005241 A1 | 1/2005 | Hunleth et al. | |
| 2006/0271887 A1 | 11/2006 | Bier et al. | |
| 2008/0060020 A1 | 3/2008 | Kelts | |
| 2009/0089701 A1* | 4/2009 | Baier ................. | G05B 19/0426 715/772 |
| 2010/0185978 A1 | 7/2010 | Laurie et al. | |

(Continued)

FOREIGN PATENT DOCUMENTS

CH WO 2014117825 A1 * 8/2014 ........... G05B 19/042
WO 2006055907 A1 5/2006

OTHER PUBLICATIONS

Brown, Scott, "The Next Generation of Interfaces for Engineering Software", Hydrocarbon Processing, Feb. 2013, pp. 69-73.

(Continued)

*Primary Examiner* — Amy Ng
*Assistant Examiner* — Michael J Cabrera
(74) *Attorney, Agent, or Firm* — Fletcher Yoder P.C.

(57) ABSTRACT

A system includes a processor configured to cause a display to display a graphical visualization of an industrial system, detect a user input corresponding to an area of the display, perform a semantic zoom of the area of the display, and to display a first level of information based on a first level of the semantic zoom. The first level of information includes a data that was not previously displayed on the area of the display. The processor is configured to perform a semantic zoom of a graphical visualization of a graphical device during the first level of the semantic zoom. The processor is configured to cause the display to transition to a concurrent display of the graphical device and a second level of information during a second level of the semantic zoom.

20 Claims, 4 Drawing Sheets

(56) References Cited

U.S. PATENT DOCUMENTS

| | | |
|---|---|---|
| 2010/0318959 A1 | 12/2010 | Rowan et al. |
| 2011/0166677 A1* | 7/2011 | Bromley et al. ............... 700/83 |
| 2011/0316884 A1* | 12/2011 | Giambalvo ....... G06F 17/30058 345/660 |
| 2012/0254792 A1* | 10/2012 | Husoy ................... G06F 3/0481 715/782 |
| 2013/0031508 A1 | 1/2013 | Kodosky et al. |
| 2013/0067420 A1* | 3/2013 | Pittappilly et al. ............ 715/863 |
| 2013/0191778 A1* | 7/2013 | Peters et al. .................. 715/786 |
| 2013/0290899 A1* | 10/2013 | Amran ......................... 715/810 |
| 2014/0135947 A1* | 5/2014 | Friman et al. .................. 700/29 |
| 2014/0181645 A1* | 6/2014 | Macbeth ....................... 715/249 |
| 2014/0240356 A1* | 8/2014 | Cupitt ..................... G09G 5/14 345/634 |
| 2014/0258940 A1* | 9/2014 | Han et al. ...................... 715/854 |
| 2014/0281868 A1* | 9/2014 | Vogel et al. ................... 715/212 |

OTHER PUBLICATIONS

Einsfeld, Katja, et al., "Multiple Dynamic Perspectives to Industrial Processes", Visualization, Imaging, and Image Processing (VIIP 2006), Aug. 30, 2006.

Kim, David, et al., "Digits: Freehand 3D Interactions Anywhere Using a Wrist-Worn Gloveless Sensor", Proceedings of the 25th Annual ACM Symposium on User Interface Software and Technology, Oct. 7, 2012, pp. 167-176, New York, USA.

PCT Search Report and Written Opinion issued May 9, 2014 in connection with corresponding PCT Patent Application No. PCT/US2014/017154.

* cited by examiner

SEMANTIC ZOOM OF GRAPHICAL VISUALIZATIONS IN INDUSTRIAL HMI SYSTEMS

BACKGROUND OF THE INVENTION

The subject matter disclosed herein relates to industrial process control systems, and more specifically, to semantic zooming in HMI systems of industrial process control systems.

Industrial facilities, such as power generation plants, may include various interrelated equipment and process field devices. For example, power generation plants may include turbine or generator systems, and processes for operating and maintaining the turbine or generator systems. Certain industrial control systems may include a human-machine interface (HMI) system, in which graphical content associated with the equipment and process field devices of the industrial facility may be displayed. However, the graphical content may be displayed with a fixed size and only static content. It would be beneficial to improve HMI systems within industrial facilities.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a processor configured to cause a display to display a graphical visualization of an industrial system, detect a user input corresponding to an area of the display, perform a semantic zoom of the area of the display, and to display a first level of information based on the semantic zoom. The first level of information includes a data that was not previously displayed on the area of the display.

In a second embodiment, a non-transitory computer-readable medium having computer executable code stored thereon is included. The code includes instructions to cause a display to display a graphical visualization of an industrial system, detect a user input corresponding to an area of the display, perform a semantic zoom of the area of the display, and to display a first level of information based on the semantic zoom. The first level of information includes a data that was not previously displayed on the area of the display.

In a third embodiment, a system includes a processor configured to cause a display to display a graphical visualization of an industrial system, detect a user input corresponding to a touch of an area of the display, perform a semantic zoom of the area of the display according to the user input, and to display a first level of information based on the semantic zoom. The first level of information includes a data that was not previously displayed on the area of the display.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
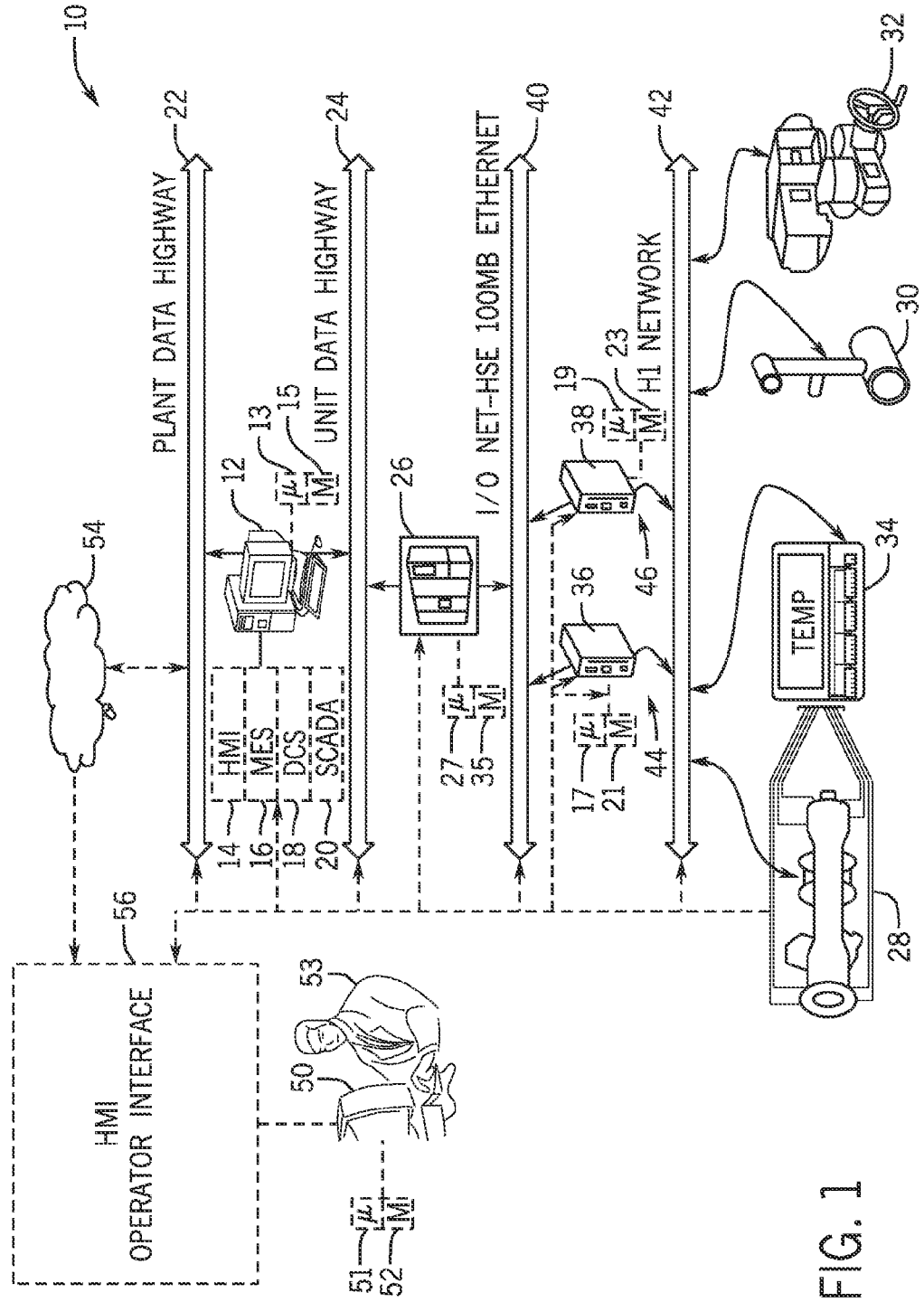
FIG. 1 is a block diagram of an embodiment of an industrial process control system including an HMI operator interface in accordance with present embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to methods and systems of applying semantic zoom in industrial HMI systems. In one embodiment, the HMI may include a touch sensitive display, in which an operator, for example, may perform a zoom of one or more areas or graphical devices (e.g., pumps, valves, physical parameter sensors, and so forth) coupled to a visualization of industrial system displayed within the interface of the HMI. In particular, as the operator continues to increase zoom magnifications (e.g., magnify) of the area or graphical device, a different visualization of the area or graphical device may be displayed to the operator. For example, a first semantic zoom level may include a display of the industrial system and various components of the industrial system. When the operator zooms sufficiently to a specific areas (e.g., nearby, inside, about, or to a portion of the industrial system, or any other component, machinery, and/or areas that may be included with the industrial system) or graphical device (e.g., pumps, valves, physical parameter sensors), the HMI may transition to a more detailed display of the area or graphical device. In certain embodiments, the detailed display of the graphical device may include both a visualization of the area or device and other data (e.g., description data, operational parameters, safety instructions, and the like) associated with the area or device. Furthermore, the points at which the HMI transitions to each semantic zoom level may be determined according to certain transition rules. As used herein, "semantic zoom" may refer to a visualization mechanism in which graphical representations of virtual and/or physical objects, general or specific areas and locations, or similar entities may be displayed differently (e.g., increasing and/or decreasing in viewable size, displaying an image of an object as well as contextual data associated with the object, and so forth) for each of a number of display levels.

With the foregoing mind, it may be useful to describe an embodiment of an industrial process control system 10 as depicted in FIG. 1. The control system 10 may include a computer 12 suitable for executing a variety of field device configuration and commissioning applications, and for providing an operator interface through which an engineer or technician may monitor the devices of the control system 10. Accordingly, the computer 12 may include a processor 13 that may be used in processing computer instructions, and a memory 15 that may be used to store computer instructions and other data. These instructions may be encoded in programs stored in tangible non-transitory computer-readable medium such as the memory 15 or other storage. The computer 12 may include any type of computing device suitable for supporting software applications, such as a laptop, a workstation, a tablet computer, or a handheld portable device (e.g., personal digital assistant or cell phone). Indeed, the computer 12 may include any of a variety of hardware and/or operating system platforms.

In accordance with one embodiment, the computer 12 may host an industrial control software, such as a human-machine interface (HMI) (e.g., combined software and hardware system) 14, a manufacturing execution system (MES) 16, a distributed control system (DCS) 18, and/or a supervisor control and data acquisition (SCADA) system 20. The HMI 14, MES 16, DCS 18, and/or SCADA 20 may include executable code instructions stored on non-transitory tangible computer readable media, such as the memory 15 of the computer system 12. For example, computer 12 may support ControlST™ and/or ToolboxST™ software, available from General Electric Co., of Schenectady, N.Y.

Further, the computer 12 may be communicatively connected to a plant data highway 22 which may allow for enabling communication between the depicted computer 12 and other computers in the plant. Indeed, the industrial control system 10 may include multiple computer systems interconnected through the plant data highway 22. The computer 12 may be further communicatively connected to a unit data highway 24, which may couple the computer 12 to an industrial controller 26. The industrial controller 26 may include a processor 27 and a memory 35 suitable for executing and storing computer instructions and/or control logic useful in automating a variety of plant equipment, such as a turbine system 28, a valve 30, a pump 32, and a temperature sensor 34. Other plant equipment may include flow meters, vibration sensors, pressure transmitters, level transmitters, actuators, relays, and so forth.

As depicted, the turbine system 28, the valve 30, the pump 32, and the temperature sensor 34 are communicatively coupled to the industrial controller 26 by using linking devices 36 and 38 suitable for interfacing between an I/O network 40 and an H1 network 42 (i.e., a fieldbus network operating at 31.25 kbits/second.). As depicted, the linking devices 36 and 38 may include processors 17 and 19, respectively, useful in executing computer instructions, and may also include memory 21 and 23, useful in storing computer instructions and other data. In certain embodiments, the I/O network 40 may be a 100 Megabit (MB) high speed Ethernet (HSE) network, and the H1 network 42 may be a 31.25 kilobit/second network. Accordingly, data transmitted and received through the I/O network 40 may in turn be transmitted and received by the H1 network 42. That is, the linking devices 36 and 38 may act as bridges between the I/O network 40 and the H1 network 42. For example, higher speed data on the I/O network 40 may be buffered, and then transmitted at suitable speed on the H1 network 42. Accordingly, a variety of field devices may be linked to the industrial controller 26 and to the computer 12.

Each of the linking devices 36 and 38 may include one or more segment ports 44 and 46 useful in segmenting the H1 network 42. For example, the linking device 36 may use the segment port 44 to communicatively couple with the device 28 and 34, while the linking device 38 may use the segment port 36 to communicatively couple with the devices 30 and 32. Distributing the input/output between the devices 28, 30, 32, and 34, by using, for example, the segment ports 44 and 46, may enable a physical separation useful in maintaining fault tolerance, redundancy, and improving communications time.

In certain embodiments, the HMI 14 may be executable by computer 50 (e.g., including processor 51 and memory 52), which may be used by an operator 53 to interface with the industrial control system 10 via an HMI operator interface 56. Accordingly, the computer 50 may include various input and output devices (e.g., mouse, keyboard, monitor, touch screen, printer, eye-tracking display, or other suitable input or output device) such that the operator 53 may provide commands (e.g., control and/or operational commands) to the industrial control system 10 and receive reports from the industrial control system 10. Furthermore, in certain embodiments, the computer 50 may be communicatively coupled to the computer system 12 (e.g., the HMI 14) through direct or indirect techniques in order to receive information regarding the operation of the HMI 14. For example, a signal conduit (e.g., cable, wireless router) may be used to directly couple the computer 50 to the computer 12. Likewise, a file transfer mechanism (e.g., remote desktop protocol (RDP), file transfer protocol (FTP), manual transfer, or other suitable mechanism) may be used to indirectly send or to receive data (e.g., files, firmware, updates). Further, cloud 54 computing techniques may be used, in which all or part of the HMI 14 resides in the cloud 54 and communicates directly or indirectly with the computer system 12 (e.g., via a network or the Internet). As will be further appreciated, the HMI 14 may allow the operator 53, for example, to perform a semantic zoom of one or more components of the industrial control system 10.

Figure 2:
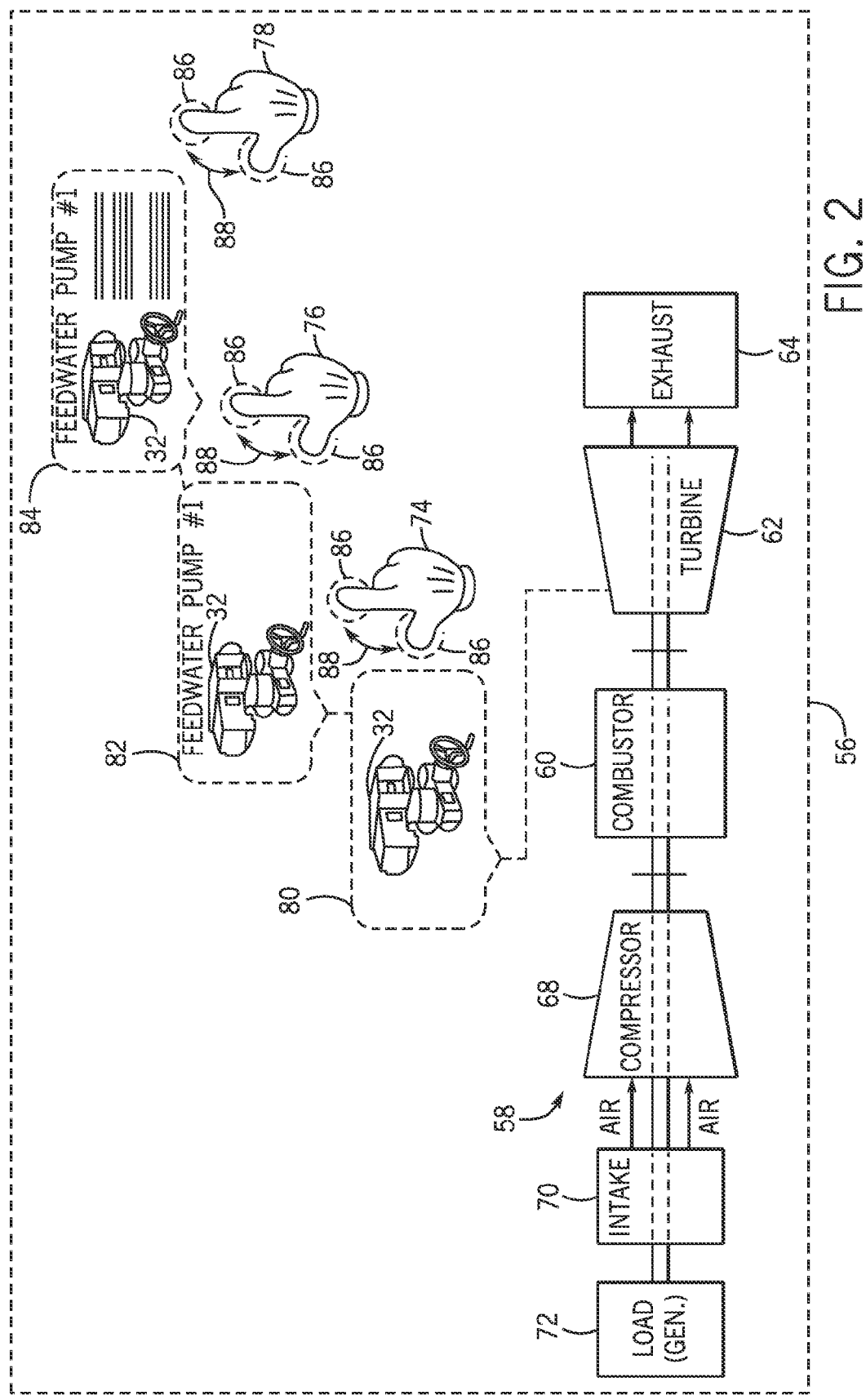
FIG. 2 is a block diagram of an embodiment of the HMI operator interface of FIG. 1 including a semantic zoom of a turbine-generator system in accordance with present embodiments.

In certain embodiments, as depicted in FIG. 2, the HMI operator interface 56 of the computer system 12 may include a graphical display representative of an example industrial system (e.g., turbine-generator system 58). However, it should be appreciated that the turbine-generator system 58 is included merely for the purpose of illustration. Other embodiments may include a variety of industrial systems such as various power plants (e.g., electrical power, mechanical power, hydroelectric power, and nuclear power), chemical plants, manufacturing plants, oil and gas refineries, and the like. As depicted, the HMI operator interface 56 may display an industrial system during real-time and/or near real-time operation of the industrial system. For example, the graphical turbine-generator system 58 may include a combustor 60, a turbine 62, an exhaust 64, a compressor 68, an intake 70, and a generator 72. As previously noted, the graphical display of the turbine-generator system 58 may represent an actual operational turbine-generator system 58. It should be appreciated that each of the components (e.g., turbine 62, generator 72, compressor 68) may include a number of sensors (e.g., temperature sensor 34, as well as pressure transmitters, flow transmitters, level transmitters, fuel sensors, clearance sensors, and so forth) and field devices (e.g., pump 32, valve 30, as well as actuators, relays, and so forth) used to monitor and control physical, environmental, and operational parameters (e.g., ambient temperature, ambient pressure, humidity, air quality, exhaust gas temperature, rotor speed, engine temperature, engine pressure, fuel temperature, engine fuel flow, exhaust flow, vibration, clearance between rotating and stationary components, compressor discharge pressure) related to the operation and performance of the turbine-generator system 58.

In certain embodiments, an operator (e.g., operator 53) monitoring the turbine-generator system 58 may wish to observe a zoom view of one or more of the sensors or field devices coupled to, for example, the turbine 62 or generator 72 of the turbine-generator system. The presently disclosed embodiments may allow the operator 53 to perform a semantic zoom of the sensors and/or field devices. For example, in one embodiment, as further depicted in FIG. 2, the operator 53 may perform one of a variety of touch gestures 74, 76, and 78 (e.g., movement of the fingers of the operator 53 across a touch sensitive display of the computer 50) via the display of the computer 50 displaying the HMI operator interface 56. The touch gestures 74, 76, and 78 may include both single-touch and multi-touch gestures. For example, the touch gestures 74, 76, and 78 may include tap gestures (e.g., single finger touch), double tap gesture (e.g., single finger touch), a two-finger tap gesture (e.g., two fingers touch concurrently), a flick gesture (e.g., single or multiple finger touch), a drag gesture (e.g., single or multiple finger touch) a rotate gesture (e.g., multiple fingers touch concurrently), a pinch gesture (e.g., multiple fingers touch concurrently), an expand gesture (e.g., multiple fingers touch concurrently), or any combination thereof. While the presently disclosed embodiments may be discussed henceforth with respect to a touch sensitive HMI operator interface 56, it should nevertheless be appreciated that the present techniques of semantic zoom may be performed using various input mechanisms such as via a scroll wheel of mouse coupled to the computer 50, body movements of the operator 53 detected by the computer 50, the point of view or eye focus (e.g., detecting that the operator 53 is staring at the turbine 62 for a certain period time) of the operator 53 to transition, for example, to and from a number of semantic zoom levels of the HMI operator interface 56.

Considering the foregoing in further detail, as further depicted in FIG. 2, an operator (e.g., operator 53) may perform the touch gesture 74 (e.g., pinching, expanding, panning gestures, or a combination thereof) by touching (e.g., as illustrated by touch points 86) an area of the interface 56 displaying the graphical turbine 62. The operator 53 may then view a first level 80 of the semantic zoom, in which, for example, a graphical representation of the pump 32 coupled to the turbine 62 may be displayed via the interface 56. It may again be worth noting that the illustration of FIG. 2 is included merely for the purpose of illustration. That is, as previously discussed, any number of sensors (e.g., temperature sensor 34 and the like) and field devices (e.g., valve 30, pump 32, and the like) may be coupled to any number of components (e.g., turbine 62, generator 72, compressor 68, or other similar components) of the turbine-generator system. Furthermore, as will be further appreciated with respect to FIG. 3, a semantic zoom may be performed to display specific areas (e.g., nearby, inside, about, or to a portion of the gas turbine system 62, the compressor 68, the load 72, or any other component, machinery, and/or areas that may be included with an industrial system), zones (e.g., safety and/or possibly hazardous zones), operating and control centers within the industrial facility, and so forth. In certain embodiments, the operator 53, or other personnel (e.g., contractors, vendors, commissioning engineers) may configure a set of semantic zoom transition rules (e.g., a set of distance, speed, position, and magnification threshold values) to control the transition to and from each level of the semantic zoom within the HMI interface 56.

For example, the operator 53 may perform an expand gesture (e.g., increase a relative distance 88 between the touch points 86), or perform a pinch gesture (e.g., decrease the relative distance 88 between the touch points 86). When the relative distance 88 is less than and/or greater than a predetermined relative distance threshold value for a respective semantic zoom level (e.g., defined for each semantic zoom level 80, 82, and 84), the HMI interface 56 may transition from semantic zoom level 80 of the pump 32 to a semantic zoom level 82 of the pump 32, or vice-versa. Expanding the gesture (e.g., increasing the relative distance 88 between the touch points 86 to a third threshold value) further may cause the HMI interface 56 to transition a display of a third semantic zoom level 84. However, the semantic zoom transition rules may not be limited to relative distance thresholds. For example, in certain embodiments, the transition rules may be defined by a relative speed (e.g., the speed of expanding and/or pinching the touch points 86, speed of rotation of touch points 86, and so forth) at which, for example, the operator 53 performs touch gestures 74, 76, and 78. In other embodiments, the transition rules may be defined according to a relative position between the touch points 86 (e.g., position of touch points 86 relative to one other and/or position of a touch point 86 relative to itself). Yet still, in another embodiment, the HMI interface 56 may transition to and from semantic zoom levels according to magnification (e.g., the increase or decrease in viewable size of the pump 32) of the pump 32. That is, should the operator 53 expand the graphical representation of the pump 32, for example, larger than a defined magnification threshold, the HMI interface 56 may transition to the next semantic zoom level (e.g., transition from semantic zoom level 80 to semantic zoom level 82).

In certain embodiments, each time the HMI interface 56 of the computer 12 transitions to a different semantic zoom level (e.g., semantic zoom levels 80, 82, and 84), the HMI interface 56 may display a different image according to the semantic zoom level. For example, as illustrated in FIG. 2, in the first semantic zoom level 80 of the pump 32, the HMI interface 56 may display an image of the pump 32. Transitioning to the second semantic zoom level 82 may cause the HMI interface 56 to display not only an image of the pump 32, for example, but also description data (e.g., manufacturer, type, serial number, and number of the pump 32). Similarly, transitioning to the third semantic zoom level 82 may cause the HMI interface 56 to concurrently display an image of the pump 32, description data, as well as operational parameters (e.g., flow rate, pressure, speed, maintenance logs, alarm condition logs, and so forth) of the pump 32. For example, the third semantic zoom level 84, as illustrated, may display a specific pump 32 (e.g., Feedwater Pump #1) and the flow rate (e.g., 5000 gallons per minute (gpm)), pressure (e.g., 300 pounds per square inch (psi)), and speed (e.g., 600 revolutions per minute (rpm)) of the pump 32.

It should be appreciated that HMI interface 56 may include any number of semantic zoom levels (e.g., 4, 5, 6, 7, or more semantic zoom levels), as the number of semantic zoom levels and data content (e.g., images, text, video, and so forth) may be user-configurable (e.g., configured by the operator 53 or other personnel). For example, although not illustrated, a fourth semantic zoom level may include a display of live graphical animation (e.g., graphical video) of the pump 32. Each semantic zoom level 80, 82, and 84 may also provide an active display, in which for example, the operator 53 may zoom to a certain semantic zoom level, and subsequently change an operating parameter (e.g., speed) of the pump 32 or perform a control action (e.g., open and/or close the valve 30) to increase or decrease flow rate and pressure of one or more components (e.g., turbine 62, generator 72, compressor 68) of the turbine-generator system 58. It should also be appreciated that semantic zoom levels 80, 82, and 84 may include and maintain spatial awareness, or the spatial distance and/or connections between graphical devices (e.g., pump 32) as the operators performs a semantic zoom of one or devices. For example, if the pump 32 is coupled to the valve 30 (or coupled to another similar pump 32), for example, a semantic zoom of the pump 32 may be displayed at each semantic zoom level (e.g., semantic zoom levels 80, 82, and 84) with its spatial relationship to the valve 30, or other components or devices.

Figure 3:
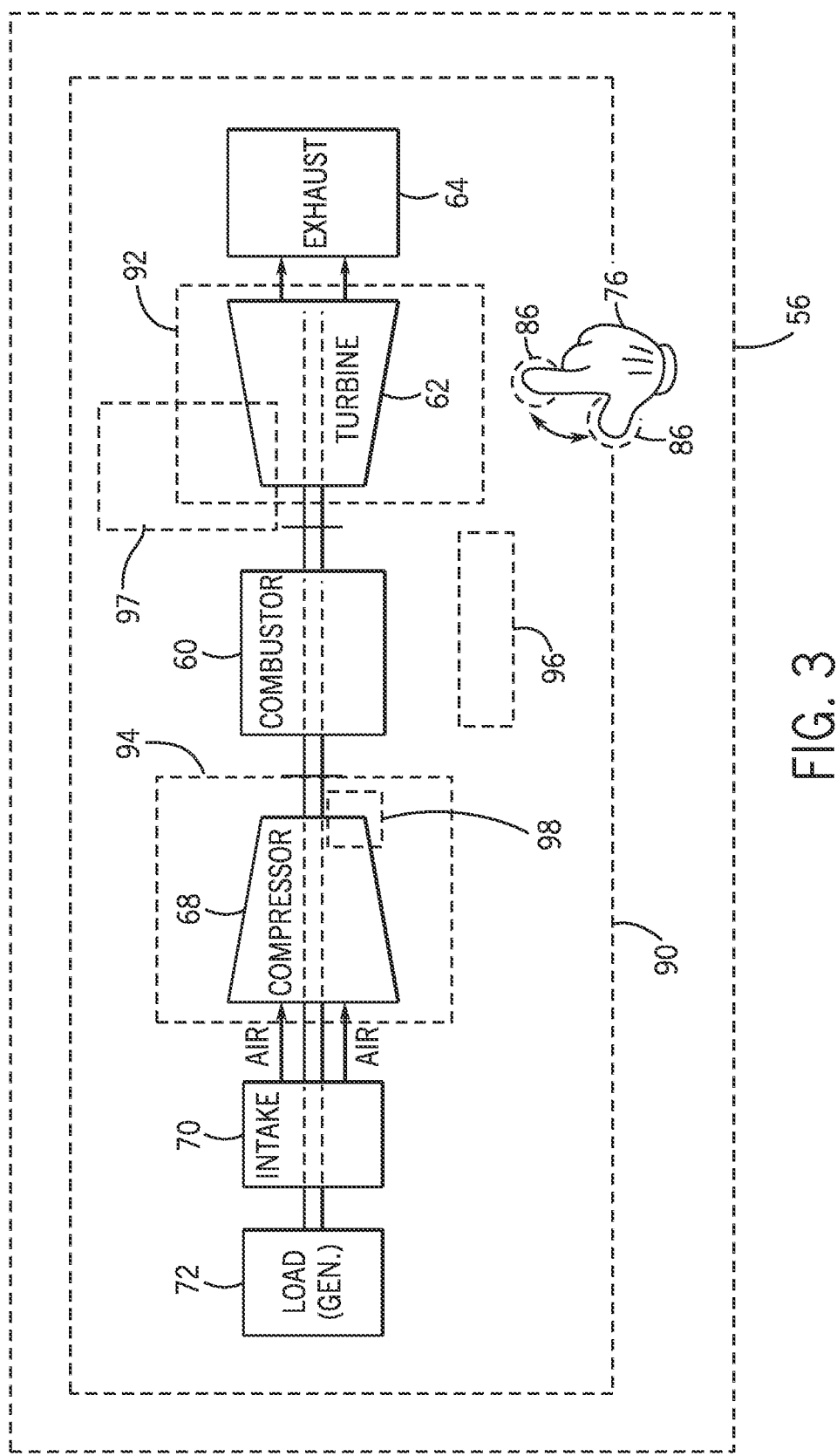
FIG. 3 is a block diagram of another embodiment of the HMI operator interface of FIG. 1 including a semantic zoom of a turbine-generator system in accordance with present embodiments.

As previously noted, in other embodiments, as illustrated in FIG. 3, an operator (e.g., operator 53) monitoring the turbine-generator system 58 may wish to perform a semantic zoom to select specific areas, such as areas nearby, inside, about, or of a proportion of the gas turbine system 62, the compressor 68, the load 72, or any other component, machinery, and/or areas that may be included with an industrial system. For example, the operator 53 may perform a semantic zoom 90 of the entire turbine-generator system. The operator 53 may also perform a semantic zoom 92 of, for example, only the turbine 62, or a semantic zoom 94 of the compressor 68. In certain embodiments, a semantic zoom may be performed with respect to a specific area 96, nearby one or more of the components that may be included with the turbine-generator system. For example, the semantic zoom may be used to select any system, a group of components, or any related systems and components for an area of the screen that is zoomed. As discussed above with respect to FIG. 2, any number of semantic zoom levels (e.g., 4, 5, 6, 7, 8, or more semantic zoom levels) may be performed. For example, upon the operator 53 performing the semantic zooms 92 and 94, the operator may then perform a semantic zooms 97 and 98 of proportions of the turbine 62 and the compressor 68. In one embodiment, each of the different semantic zoom levels may appear cascaded. However in other embodiments, each of the different semantic zoom levels may appear horizontally and/or vertically spaced, or appear in a similar arrangement. Although not illustrated, it should be appreciated that the operator 53, for example, may perform a semantic zoom of specific zones such as safety and/or possibly hazardous zones.

Figure 4:
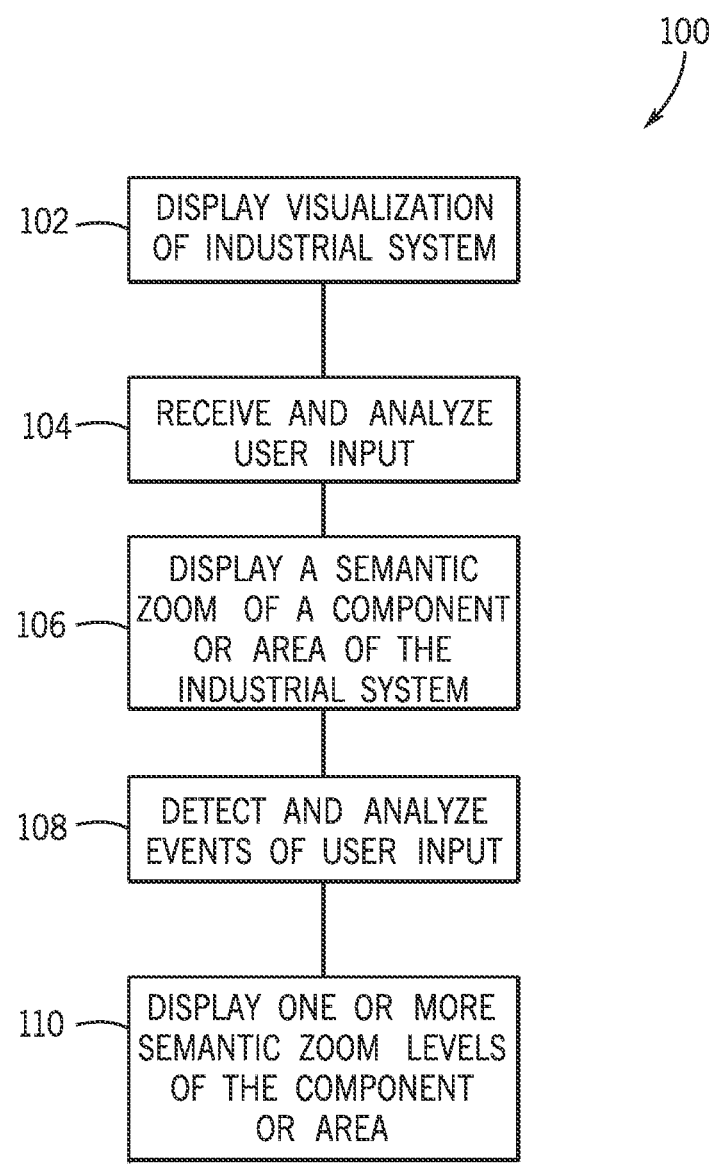
FIG. 4 is a flowchart illustrating an embodiment of a process suitable for performing a semantic zoom via the HMI operator interface of FIG. 1 in accordance with present embodiments.

As shown in FIG. 4, a flow diagram is presented, illustrating an embodiment of a process 100 useful in implementing a semantic zoom within an HMI interface of one or more components of an industrial system. It should be appreciated that the process 100 may be useful in performing semantic zooms of specific components of a visualization of an industrial system, or performing semantic zooms of specific locations or areas (e.g., nearby, inside, or about the gas turbine system 62, the compressor 68, the load 72, or any other component and/or machinery that may be included with an industrial system). The process 100 may include code or instructions stored in a non-transitory machine-readable medium (e.g., the memory 52) and executed, for example, by one or more processors (e.g., processor 51). The process 100 may begin with the computer system 50 displaying (block 102) an HMI visualization of an industrial system. As previously discussed, the HMI operator interface 56 may be displayed via a touch sensitive display, an eye-tracking, or other similar display of the computer 50 useful in detecting various user inputs (e.g., computer mouse and keyboard inputs, touch gesture inputs).

The process 100 may continue with the HMI interface 56 of the computer 50 receiving and analyzing the user inputs (e.g., touch gestures 74, 76, and 78). For example, the HMI interface 56 of the computer 50 may detect a specific touch gesture 74, 76, and 78 (e.g., tap gesture, pinch gesture, expand gesture, rotate gesture) performed, for example, by the operator 53. The HMI interface 56 may then display (block 106) a semantic zoom of a visual (e.g., graphical) representation of one or more areas or graphical devices of the industrial system touched by the operator 53. The HMI interface 56 of the computer may detect and analyze (block 108) events associated with the user input. For example, as discussed above with respect to FIG. 2, the HMI interface 56 of the computer 50 may determine whether or not to transition to the next semantic zoom level (e.g., second and third semantic zoom levels 82 and 84) according to certain user-defined and/or manufacturer-configured transition rules. For example, the relative distance between respective touch points 86 of the touch gestures 74, 76, and 78), the relative speed of the touch gestures 74, 76, and 78, the relative position of the touch points 86 of the touch gestures 74, 76, and 78, or the magnification level of the selected graphical device may be detected and analyzed by the computer 50. When the certain transition rule threshold is exceeded and/or satisfied, the HMI interface 56 of the computer 50 may then display (block 110) a more detailed view of the area or graphical device (e.g., graphical pump 32) concurrently with contextual data (e.g., description data and/or operational data) associated with the area or graphical device of the industrial system.

Technical effects of the present embodiments relate to methods and systems of applying semantic zoom in industrial HMI systems. In one embodiment, the HMI may include a touch sensitive display, in which an operator, for example, may perform a zoom of one or more areas or graphical devices (e.g., pumps, valves, physical parameter sensors, and so forth) coupled to a visualization of industrial system displayed within the interface of the HMI. In particular, as the operator continues to increase zoom magnifications (e.g., magnify) of the area or graphical device, a different visualization of the area or graphical device may be displayed to the operator. For example, a first semantic zoom level may include a display of the industrial system and various components of the industrial system. When the operator zooms sufficiently to a specific areas (e.g., nearby, inside, about, or to a portion of the industrial system, or any other component, machinery, and/or areas that may be included with the industrial system) or graphical device (e.g., pumps, valves, physical parameter sensors), the HMI may transition to a more detailed display of the area or graphical device. In certain embodiments, the detailed display of the graphical device may include both a visualization of the area or device and other data (e.g., description data, operational parameters, safety instructions, and the like) associated with the area or device. Furthermore, the points at which the HMI transitions to each semantic zoom level may be determined according to certain transition rules.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an industrial controller comprising processor configured to:
receive sensor signals from at least one hardware sensor;
control a turbine system via a physical actuator based on the sensor signals;
cause a display to display a graphical visualization of an industrial system;
detect a user input corresponding to an area of the display;
perform a semantic zoom of the area of the display;
display a first level of information based on a first level of the semantic zoom, wherein the first level of information comprises a data that was not previously displayed on the area of the display;
perform a semantic zoom of a graphical visualization of a graphical device during the first level of the semantic zoom upon detection of a first industrial controller event, wherein the first level of the semantic zoom comprises a first context;
cause the display to transition to a concurrent display of the graphical device and a second level of information associated with the graphical device during a second level of the semantic zoom upon detection of a second industrial controller event, wherein the second level of information comprises a second data that was not previously displayed during the first level of the semantic zoom, wherein the second level of the semantic zoom comprises a second context different from the first context, and wherein the graphical device displayed during the first level of the semantic zoom comprises the same graphical device displayed during the second level of the semantic zoom; and
detect a second user input corresponding to a command to change an operating parameter of the graphical device after the display transitions to the second level of the semantic zoom, wherein the graphical device comprises a turbine graphics, a generator graphics, an industrial component graphics, or a combination thereof, and wherein changing the operating parameter comprises changing a pressure, a flow rate, a temperature, a speed, a vibration, or a combination thereof, associated with the graphical device.

2. The system of claim 1, wherein the data comprises a text displaying an operational data, a configuration data, a maintenance log, a maintenance schedule, an equipment list, an operator list, a supervisor list, an alarm, an alert, or a combination thereof.

3. The system of claim 1, wherein the user input comprises a touch gesture, a scroll of a wheel of a computer mouse, a body movement, an eye movement, a depressing of a keypad, or a combination thereof.

4. The system of claim 3, wherein the touch gesture comprises a tap gesture, a double tap gesture, a two-finger tap gesture, a drag gesture, a flick gesture, a rotate gesture, a pinch gesture, an expand gesture, a pan gesture, or a combination thereof.

5. The system of claim 1, wherein the display comprises a touch sensitive display, a motion-tracking display, an eye-tracking display, or a combination thereof.

6. The system of claim 1, wherein the processor is configured to detect a first touch and a second touch of the display concurrently, and configured to cause the display to transition to the second level of the semantic zoom based on a relative distance between the first touch and the second touch.

7. The system of claim 1, wherein the processor is configured to detect a first touch and a second touch of the display concurrently, and configured to cause the display to transition between the first level of the semantic zoom, the second level of the semantic zoom, and a third level of the semantic zoom as a distance between the first touch and the second touch increases or decreases.

8. The system of claim 1, wherein the graphical visualization of the industrial system comprises a graphical visualization of a gasification system, a gas turbine system, a hydroturbine system, a steam turbine system, a gas treatment system, a power generation system, or a combination thereof.

9. The system of claim 8, wherein the graphical device comprises a graphical visualization of a pump, a valve, a level transmitter, a pressure transmitter, a temperature transmitter, a flow transmitter, an actuator, a relay, or a combination thereof, communicatively coupled to one of the gasification system, the gas turbine system, the hydroturbine system, the steam turbine system, the gas treatment system, or the power generation system.

10. The system of claim 1, wherein the first industrial controller event comprises a first transition rule, and wherein the second industrial controller event comprises a second transition rule.

11. A non-transitory computer-readable medium having computer executable code stored thereon, the code comprising instructions to:
cause a display communicatively coupled to an industrial controller configured to control a turbine system via a physical actuator based on the sensor signals to display a graphical visualization of an industrial system;
detect a user input corresponding to an area of the display;
perform a semantic zoom of the area of the display;
display a first level of information based on a first level of the semantic zoom, wherein the first level of information comprises a data that was not previously displayed on the area of the display;
perform a semantic zoom of a graphical visualization of a industrial device during the first level of the semantic zoom upon detection of a first industrial controller event, wherein the first level of the semantic zoom comprises a first context;
cause the display to transition to a concurrent display of the industrial device and a second level of information associated with the industrial device during a second level of the semantic zoom upon detection of a second industrial controller event, wherein the second level of information comprises a second data that was not previously displayed during the first level of the semantic zoom, wherein the second level of the semantic zoom comprises a second context different from the first context, and wherein the industrial device displayed during the first level of the semantic zoom comprises the same industrial device displayed during the second level of the semantic zoom; and
detect a second user input corresponding to a command to change an operating parameter of the industrial device after the display transitions to the second level of the semantic zoom, wherein the industrial device comprises a gas turbine, a hydroturbine, a steam turbine, a generator, a power production system, a gasification system, or a combination thereof, and wherein changing the operating parameter comprises changing a pressure, a flow rate, a temperature, a speed, a vibration, or a combination thereof, associated with the graphical device.

12. The non-transitory computer-readable medium of claim 11, wherein the code comprises instructions to perform a semantic zoom of a graphical visualization of a portion of the industrial device during the first level of the semantic zoom, and configured to cause the display to transition to a concurrent display of the industrial device and the second data associated with the industrial device during the second level of the semantic zoom.

13. The non-transitory computer-readable medium of claim 11, wherein the code comprises instructions to detect a first touch and a second touch of the display concurrently, and to cause the display to transition to the second level of the semantic zoom based on a relative distance between the first touch and the second touch.

14. The non-transitory computer-readable medium of claim 11, wherein the code comprises instructions to detect a first touch and a second touch of the area of the display concurrently, and to cause the display to transition between the first level of the semantic zoom, the second level of the semantic zoom, and a third level of the semantic zoom as a detected distance between the first touch and the second touch increases or decreases.

15. The non-transitory computer-readable medium of claim 11, wherein the code comprises instructions to display a first display of a graphical device during the first level of the semantic zoom, a second display of the graphical device during a second level of the semantic zoom, and a third display of the graphical device during a third level of the semantic zoom, wherein the first display, the second display, and the third display are each different from one another, and wherein one of the second display and the third display comprises a perspective view of the graphical device and the second data associated with the graphical device.

16. The non-transitory computer-readable medium of claim 11, wherein the first industrial controller event comprises a first transition rule, and wherein the second industrial controller event comprises a second transition rule.

17. A system, comprising:
an industrial controller comprising a processor configured to:
receive sensor signals from at least one hardware sensor;
control a turbine system via a physical actuator based on the sensor signals;
cause a display to display a graphical visualization of an industrial system;
detect a user input corresponding to a touch of an area of the display;
perform a semantic zoom of the area of the display according to the user input;
display a first level of information based on a first level of the semantic zoom, wherein the first level of information comprises a data that was not previously displayed on the area of the display;
perform a semantic zoom of a graphical visualization of a graphical device during the first level of the semantic zoom upon detection of a first industrial controller event, wherein the first level of the semantic zoom comprises a first context;
cause the display to transition to a concurrent display of the graphical device and a second level of information associated with the graphical device during a second level of the semantic zoom upon detection of a second industrial controller event, wherein the second level of information comprises a second data that was not previously displayed during the first level of the semantic zoom, wherein the second level of the semantic zoom comprises a second context different from the first context, and wherein the graphical device displayed during the first level of the semantic zoom comprises the same graphical device displayed during the second level of the semantic zoom; and
detect a second user input corresponding to a command to change an operating parameter of the graphical device after the display transitions to the second level of the semantic zoom, wherein the graphical device comprises a turbine graphics, a generator graphics, an industrial component graphics, or a combination thereof, and wherein changing the operating parameter comprises changing a pressure, a flow rate, a temperature, a speed, a vibration, or a combination thereof, associated with the graphical device.

18. The system of claim 17, wherein the processor is configured to detect a first touch and a second touch of the display concurrently, and wherein the processor is configured to cause the display to transition to the second level of the semantic zoom by detecting a relative distance between the first touch and the second touch, a relative speed between movement of the first touch and the second touch, a relative position of the first touch and the second touch, a magnification level of the viewable size of the area, or a combination thereof.

19. The system of claim 17, wherein the processor is configured to perform a semantic zoom of a plurality of graphical devices representative of industrial devices included in the industrial system, and wherein the processor is configured to cause the display to display a first spatial distance between the plurality of graphical devices during the first level of the semantic zoom and to display a second spatial distance between the plurality of graphical devices during the second level of the semantic zoom, wherein the first spatial distance and the second spatial distance are substantially equal.

20. The system of claim 17, wherein the first industrial controller event comprises a first transition rule, and wherein the second industrial controller event comprises a second transition rule.

* * * * *